US012051551B2

(12) United States Patent
Irving

(10) Patent No.: US 12,051,551 B2
(45) Date of Patent: Jul. 30, 2024

(54) FULL SIZE ROCKER HOUSING WITH PIEZO BUZZER

(71) Applicant: Flow Control LLC, Beverly, MA (US)

(72) Inventor: Michael Howard Irving, Wilmington, MA (US)

(73) Assignee: FLOW CONTROL LLC, Beverly, MA (US)

( * ) Notice: Subject to any disclaimer, the term of this patent is extended or adjusted under 35 U.S.C. 154(b) by 0 days.

(21) Appl. No.: 16/158,503

(22) Filed: Oct. 12, 2018

(65) Prior Publication Data

US 2019/0214204 A1 Jul. 11, 2019

Related U.S. Application Data

(60) Provisional application No. 62/571,553, filed on Oct. 12, 2017.

(51) Int. Cl.

*H01H 23/14* (2006.01)
*H01H 23/02* (2006.01)
*H01H 23/12* (2006.01)
*H01H 23/00* (2006.01)

(52) U.S. Cl.

CPC ............ *H01H 23/12* (2013.01); *H01H 23/02* (2013.01); *H01H 23/006* (2013.01); *H01H 2215/03* (2013.01); *H01H 2215/052* (2013.01)

(58) Field of Classification Search

CPC ................. H01H 13/702; H01H 13/85; H01H 2209/074; H01H 2215/00; H01H 2215/006; H01H 2215/05; H01H 2215/052; H01H 2217/018; H01H 2217/024; H01H 2217/032; H01H 2217/033; H01H 2217/036; H01H 2221/002; H01H 2225/018; H01H 2231/022; H01H 2239/006; H01H 13/023; H01H 13/84; H03K 17/964; H03K 2217/96015; H03K 17/965; H03K 17/96; H03K 17/9643

See application file for complete search history.

(56) References Cited

U.S. PATENT DOCUMENTS 3,944,768 A 3/1976 Aryamane et al.
4,004,409 A 1/1977 Ganter et al.
4,045,954 A 9/1977 Ganter et al.
4,306,229 A 12/1981 Tamura et al.
4,386,254 A 5/1983 Eberhardt et al.
4,462,696 A * 7/1984 Yung .................... G04G 17/02 368/204
4,777,333 A 10/1988 Valenzona
4,945,346 A 7/1990 Schmiemann
4,963,854 A 10/1990 Stuecker (Continued)

*Primary Examiner* — Ahmed M Saeed

(74) *Attorney, Agent, or Firm* — Ware, Fressola, Maguire Barber LLP

(57) ABSTRACT

A rocker switch assembly features a rocker switching mechanism and a rocker base housing. The rocker switching mechanism has a switch cover and rocker configured to rock between rocking positions in response to rocking switch forces applied thereon, and provide a rocking switch actuator force. The rocker base housing has a piezo buzzer and rocker switch circuitry, e.g., including contacts/terminals. The piezo buzzer is configured to respond to the rocking switch actuator force, and provide signaling from the piezo buzzer to rocker switch circuitry, based upon the rocking switch actuator force applied.

10 Claims, 5 Drawing Sheets

Piezo buzzer installed inside the base of a full sized rocker switch

(56) References Cited

U.S. PATENT DOCUMENTS

| | | | | |
|---|---|---|---|---|
| 5,213,204 | A | 5/1993 | Sommer | |
| 5,343,007 | A | 8/1994 | Roeser et al. | |
| 5,380,972 | A | 1/1995 | Lunak et al. | |
| 5,603,400 | A | 2/1997 | Goto et al. | |
| 5,636,729 | A * | 6/1997 | Wiciel | H01H 13/023 200/181 |
| 5,645,753 | A | 7/1997 | Fukuoka et al. | |
| 5,801,622 | A | 9/1998 | Chunick | |
| 5,982,287 | A | 11/1999 | Brannen et al. | |
| 5,990,431 | A | 11/1999 | Wright | |
| 6,175,090 | B1 | 1/2001 | Blossfeld | |
| 6,220,538 | B1 | 4/2001 | Durso | |
| 6,508,617 | B1 | 1/2003 | Gressett | |
| 7,548,013 | B2 | 6/2009 | Brosch et al. | |
| 8,773,356 | B2 | 7/2014 | Martin et al. | |
| 9,880,663 | B2 | 1/2018 | Keski-Jaskari | |
| 2004/0012560 | A1 * | 1/2004 | Jasso | G09B 21/003 345/156 |
| 2006/0028095 | A1 | 2/2006 | Maruyama et al. | |
| 2010/0181172 | A1 * | 7/2010 | Monig | H03K 17/964 200/181 |
| 2012/0024682 | A1 * | 2/2012 | Huang | G06F 3/0202 200/5 A |
| 2012/0105333 | A1 | 5/2012 | Maschmeyer et al. | |
| 2017/0045405 | A1 * | 2/2017 | Hou | G01L 1/16 |

* cited by examiner

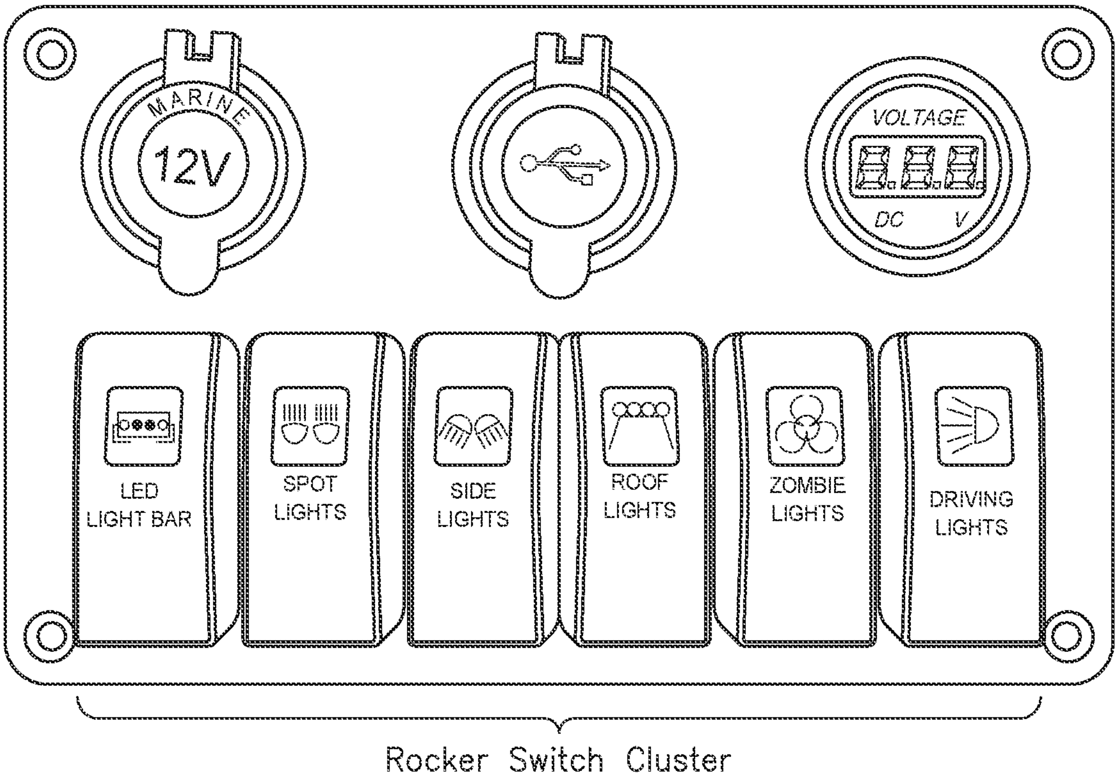
*FIG. 1*: A Panel having a Rocker Switch Cluster
(PRIOR ART)

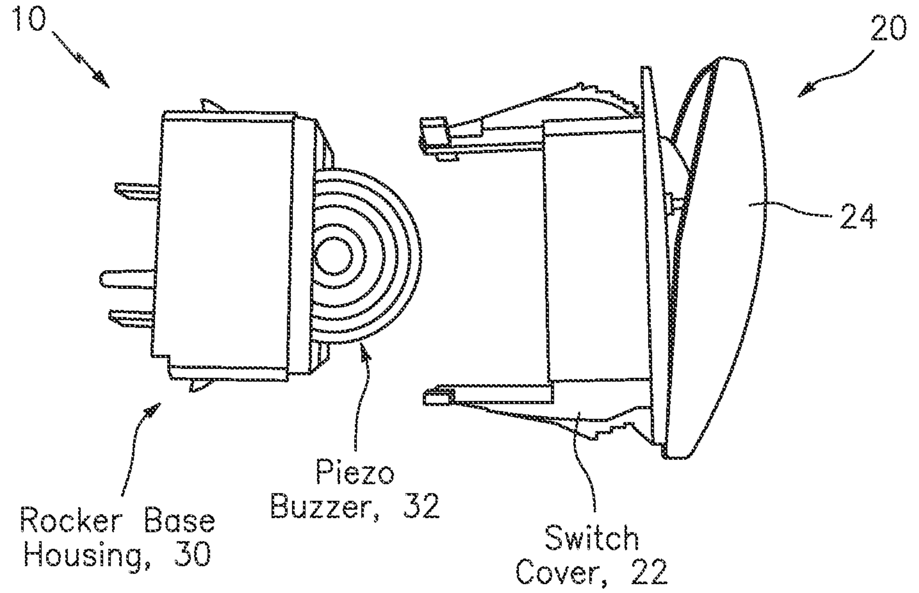
*FIG. 2*: Piezo buzzer installed inside the base of a full sized rocker switch
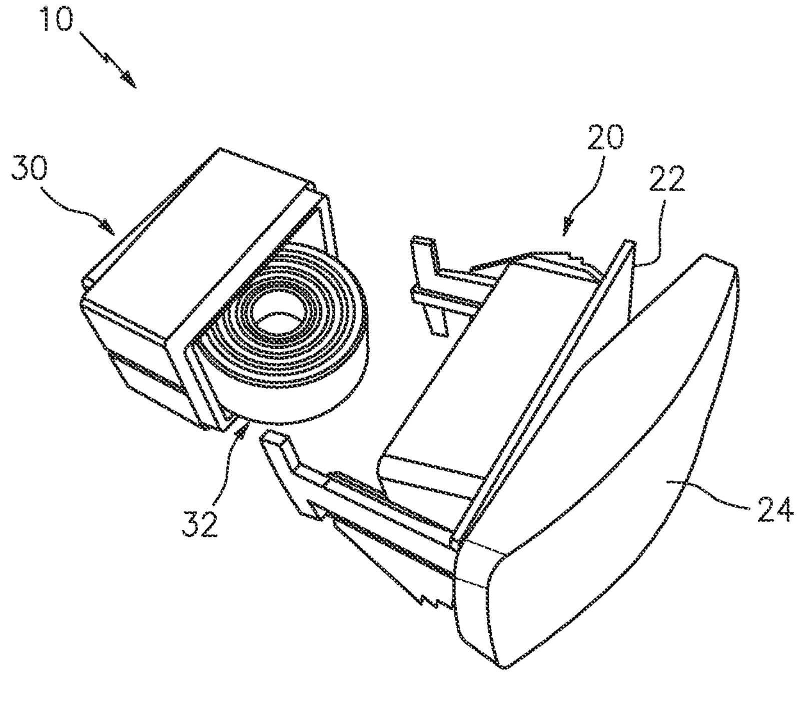
*FIG. 3*: 2nd view of piezo buzzer installed inside the base of a full sized rocker switch

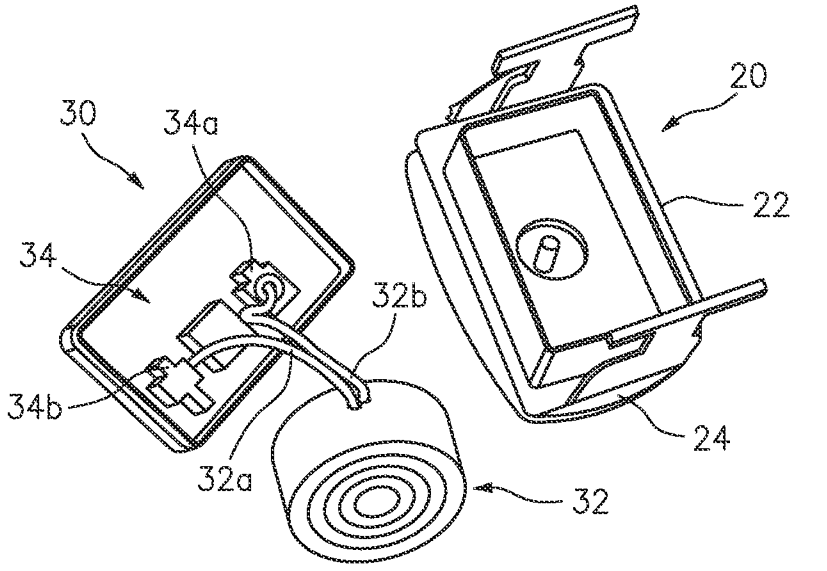
*FIG. 4*: Piezo buzzer soldered to the terminal of the full sized rocker base
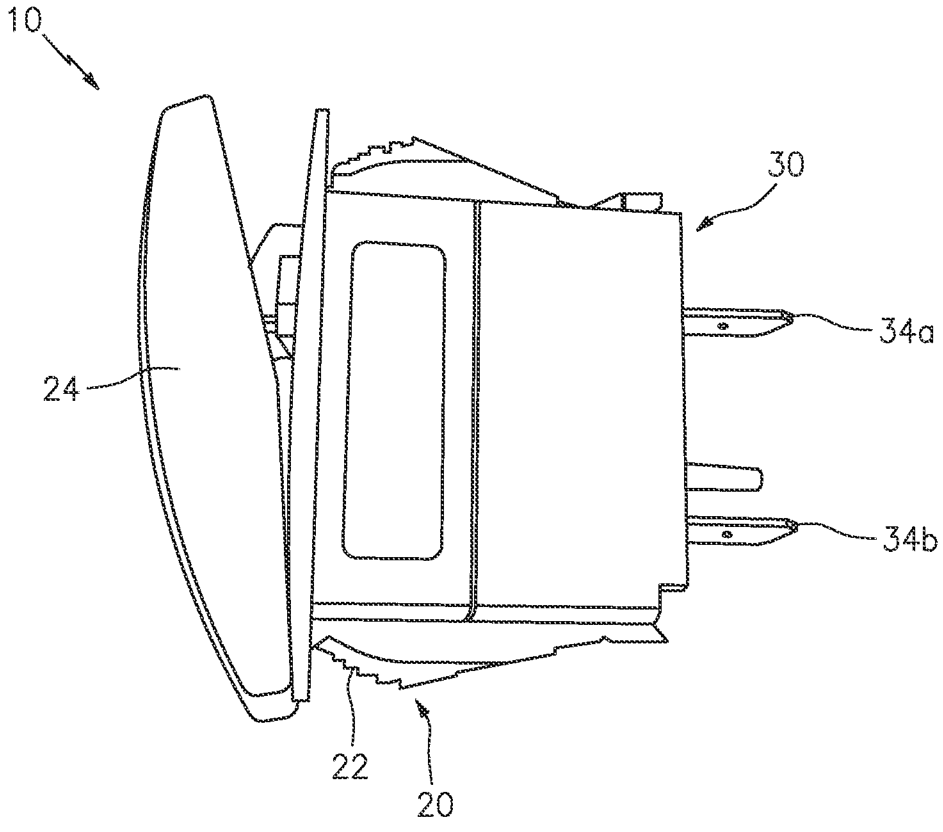
*FIG. 5*: Full assembly

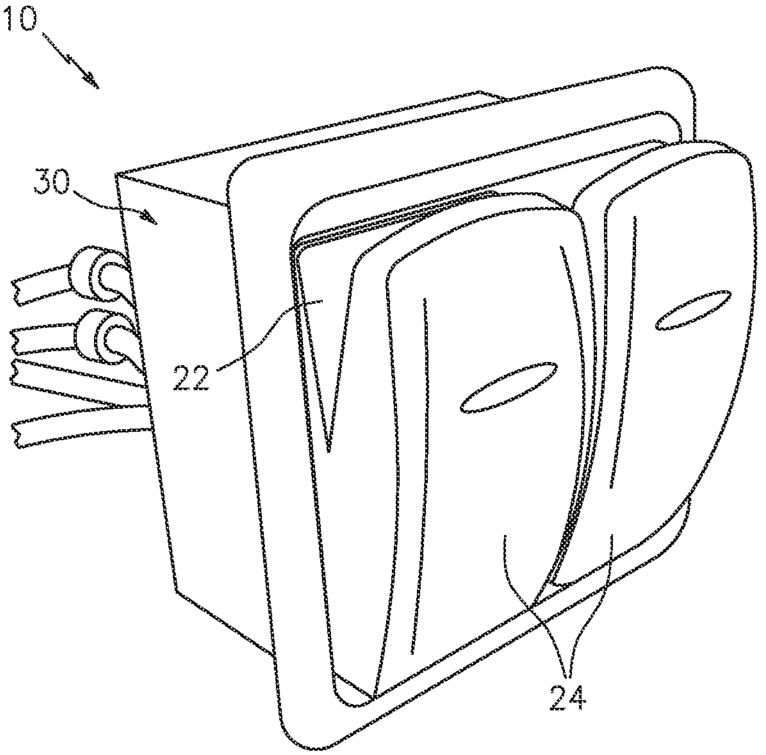
*FIG. 6*: Piezo buzzer installed on the right beside a standard rocker switch

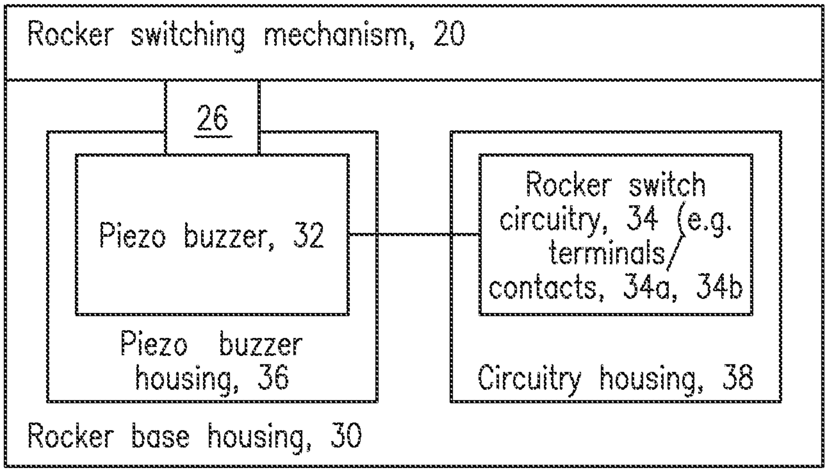
*FIG. 7*: Rocker switch assembly having a rocker switching mechanism that actuates a piezo buzzer for providing piezo buzzer signaling to rocker switch circuitry
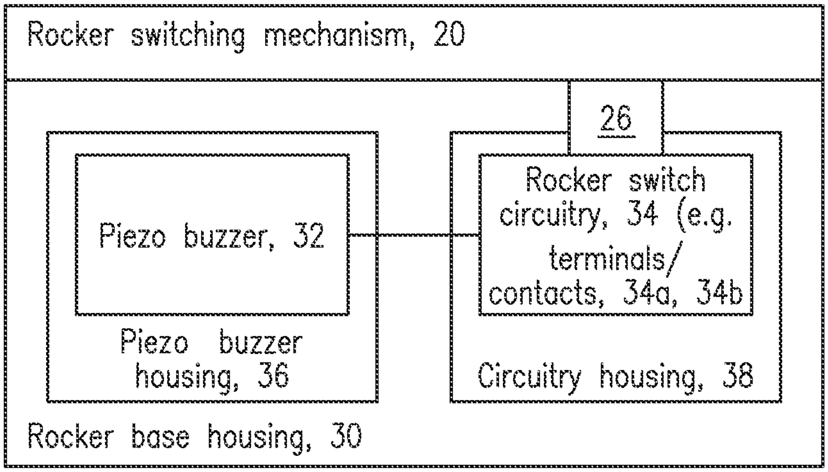
*FIG. 8*: Rocker switch assembly having a rocker switching mechanism that actuates rocker switch circuitry for triggering a piezo buzzer

FULL SIZE ROCKER HOUSING WITH PIEZO BUZZER

CROSS-REFERENCE TO RELATED APPLICATIONS

This application claims benefit to provisional patent application Ser. No. 62/571,553 (911-017.050-1//M-RLE-X0025), filed 12 Oct. 2017, which is incorporated by reference in their entirety.

BACKGROUND OF THE INVENTION

1. Field of Invention

The present invention relates to a rocker switch.

2. Description of Related Art

Rocker switches are known in the art. By way of example, different types and kinds of rocker switches are disclosed in the following U.S. Pat. Nos. 3,944,768; 4,386,254; 4,777,333; 5,213,204; 5,343,007; 5,380,972; 5,603,400; 6,175,090, which are all incorporated by reference in their entirety.

Piezo buzzers are also known in the art. By way of example, different types and kinds of piezo buzzers are disclosed in the following U.S. Pat. Nos. 4,004,409; 4,045,954; 4,306,229; 4,945,346; 4,963,854; 5,645,753; 5,801,622; 5,982,287; 6,058,617; 6,220,538; 7,548,013; 7,548,013; 9,880,663, which are all incorporated by reference in their entirety.

There is no known product in the marketplace that allows a user to install an alarm buzzer into a full sized rocker switch cluster, e.g., like that shown in FIG. 1. Current warning alarms or buzzers require an installer to cut or drill a new opening on a mounting surface to install the rocker switch mechanism, which is costly, time-consuming and can be aesthetically unpleasing.

SUMMARY OF THE INVENTION

The Basic Invention

In summary, the present invention provides a new rocker switch assembly that is manufactured with a piezo buzzer inside the switch housing, which allows a customer to install a warning buzzer into the switch cluster like the full sized rocker switch cluster shown in FIG. 1, e.g., consistent with that set forth below. The present invention eliminates the need for the installer to cut or drill a new opening on the mounting surface to install the rocker switch mechanism.

Specific Embodiment

According to some embodiments, the present invention may include, or take the form of, a rocker switch assembly featuring a rocker switching mechanism and a rocker base housing.

The rocker switching mechanism includes a switch cover and a rocker configured to rock between rocking positions in response to rocking switch forces applied thereon, and provide a rocking switch actuator force.

The rocker base housing has a combination of a piezo buzzer and rocker switch circuitry, e.g., including contacts/terminals. The combination is configured to respond to the rocking switch actuator force, and provide signaling between the piezo buzzer and rocker switch circuitry, based upon the rocking switch actuator force applied. By way of example, and according to some embodiments of the present invention, implementations set forth herein may include the signaling being provided from the piezo buzzer to the rocker switch circuitry, or alternatively from the rocker switch circuitry to the piezo buzzer.

Rocker Switching Mechanism Actuates Piezo Buzzer

By way of example, and according to some embodiments, the rocker switch assembly may include implementations where the rocker switching mechanism actuates the piezo buzzer, having one or more of the following features:

The piezo buzzer may be configured to respond to the rocking switch actuator force, and provide the signaling in the form of piezo buzzer signaling to the rocker switch circuitry, e.g., for actuating the rocker switch circuitry and its associated functionality.

The rocker base housing may include a piezo buzzer housing configured to receive and house at least part of the piezo buzzer.

The rocker base housing may also include a circuitry housing configured to receive and house the rocker switch circuitry.

The piezo buzzer may be configured as a crystal or ceramic.

The crystal or ceramic may be configured to respond to the rocking switch actuator force, deform and provide the signaling along with a buzzer sound.

The signaling may take the form voltage signaling, e.g., including AC voltage signaling.

The rocker switch circuitry may be configured to respond to the signaling received and provide corresponding rocker switch circuitry signaling containing information about the actuation of the piezo buzzer.

The rocker switch assembly may include, or form part of, a rocker switch cluster, e.g., having multiple rocker switch assemblies.

The switch cover and rocker may include, or may be arranged to form, an actuator assembly configured to apply the rocking switch actuator force on the piezo buzzer. By way of example, the rocker may include an actuator member that presses against the piezo buzzer when the rocker is pressed in one of the rocking positions.

The piezo buzzer may be installed at least partly inside the rocker base housing.

The rocker switch circuitry may include terminals/contacts, and the piezo buzzer may include wiring soldered to the contacts/terminals.

Rocker Switch Circuitry Actuates Piezo Buzzer

By way of further example, and according to some embodiments, the present invention may include implementations where the rocker switch circuitry actuates the piezo buzzer, having one or more of the following features:

The rocker switch circuitry may be configured to respond to the rocking switch actuator force, and provide the signaling in the form of rocker switch circuitry signaling to the piezo buzzer, e.g., causing the piezo buzzer to provide a piezo buzzer sound confirming that the rocker switching mechanism was pressed and that the rocker switch circuitry and its associated functionality was actuated. For example, the rocker switch circuitry may be configured to provide the signaling in the form of the voltage to deform the piezo buzzer. The switch cover and rocker may include, or may be arranged to form, an actuator assembly configured to apply the rocking switch actuator force on some part of the rocker switch circuitry that is configured to be actuated.

BRIEF DESCRIPTION OF THE DRAWING

The drawing includes FIGS. 1-8, which are not necessarily drawn to scale, as follows:

FIG. 1 is a photograph showing a panel having a rocker switch cluster that is known in the art.

FIG. 2 is a photograph showing a top down view of a piezo buzzer installed inside the base of a full sized rocker switch, according to some embodiments of the present invention.

FIG. 3 is a photograph showing a perspective view of a piezo buzzer installed inside at least part of the base of a full sized rocker switch, according to some embodiments of the present invention.

FIG. 4 is a photograph showing a top down view of a piezo buzzer having wiring soldered to contacts/terminals of the full sized rocker base, according to some embodiments of the present invention.

FIG. 5 is a photograph showing a view of a full assembly of a rocker switch assembly having a piezo buzzer installed inside the base of a full sized rocker switch, according to some embodiments of the present invention.

FIG. 6 is a photograph showing a perspective view of a piezo buzzer installed in a rocker switch assembly shown on the right beside a standard rocker switch shown on the left, according to some embodiments of the present invention.

FIG. 7 is a block diagram showing a rocker switch assembly having a rocker switching mechanism that actuates a piezo buzzer for providing piezo buzzer signaling to rocker switch circuitry, according to some embodiments of the present invention.

FIG. 8 is a block diagram showing a rocker switch assembly having a rocker switching mechanism that actuates rocker switch circuitry for triggering a piezo buzzer, according to some embodiments of the present invention.

In the drawing, every element is not labeled with every reference no. and lead line to reduce clutter in the drawing as a whole.

DETAILED DESCRIPTION OF BEST MODE OF THE INVENTION

FIGS. 2-7: Rocker Switching Mechanism Actuates Piezo Buzzer

FIGS. 2-7 show a rocker switch assembly generally indicates as 10 featuring a rocker switching mechanism generally indicated as 20 and a rocker base housing generally indicated as 30.

The rocker switching mechanism 20 includes a switch cover 22 and a rocker 24 configured to rock between rocking positions in response to rocking switch forces applied thereon, and provide a rocking switch actuator force. By way of example, the rocking switch forces may be applied by a user who presses the rocker 24 causing it to rock from a first rocking position to a second rocking position, including where the first rocking position is an ON position and the second rocking position is an OFF position, or vice versa. The rocker 24 may be pivotally arranged on the switch cover 22 to rock between rocking positions, e.g., using techniques that are known in the art.

The rocker base housing 30 includes a piezo buzzer 32 and rocker switch circuitry generally indicated as 34, e.g., which may include, or take the form of, contacts/terminals 34*a*, 34*b*. In FIG. 4, the contacts/terminals 34*a*, 33*b* are coupled to wiring 32*a*, 32*b* of the piezo buzzer 32. In operation, the piezo buzzer 32 may be configured to respond to the rocking switch actuator force, deform, and provide signaling from the piezo buzzer 32 to rocker switch circuitry 34, based upon the rocking switch actuator force applied. In the implementations shown in FIGS. 2-7, the signaling is provide from the piezo buzzer 32 to the contacts/terminals 34*a*, 33*b* of the rocker switch circuitry 34. In FIG. 4, the wiring 32*a*, 32*b* of the piezo buzzer 32 is soldered to the contacts/terminals 34*a*, 33*b* of the rocker switch circuitry 34 in rocker base housing 30 of the full sized rocker base.

The rocker base housing 30 may include a piezo buzzer housing 36 (see FIG. 7) configured to receive and house at least part of the piezo buzzer 32, e.g., as shown in FIGS. 2-4 and 7. Moreover, consistent with that shown in FIGS. 2-3, the switch cover 22 may be configured to receive and house at least a corresponding part of the piezo buzzer 32. The scope of the invention is not intended to be limited to how much of the piezo buzzer 32 is housed in the piezo buzzer housing 36, and how much of the piezo buzzer 32 is housed in switch cover 22.

The rocker base housing 30 may also include a circuitry housing 38 (see FIG. 7) configured to receive and house the rocker switch circuitry 34.

The switch cover 22 and rocker 24 may include, or may be arranged to form, an actuator assembly 26 (see FIG. 7) configured to apply the rocking switch actuator force on the piezo buzzer 32. As one skilled in the art would appreciate, actuator assemblies like element 26 configured to apply an actuator force from a first element onto a second element, e.g., in response to the pressing of the first element, are known in the art, and the scope of the invention is not intended to be limited to any particular type or kind thereof either now known or later developed in the future. By way of example, the reader is referred to the rocker switch patents listed herein, which disclose different types and kinds of actuator assemblies configured to apply an actuator force from a first element to a second element in response to the first element being pressed.

FIG. 8: Rocker Switch Circuitry 34 Actuates Piezo Buzzer 32

According to some embodiments, the rocker switch circuitry 34 may be configured to respond to the rocking switch actuator force applied by the actuator assembly 26, and provide the signaling in the form of rocker switch circuitry signaling to the piezo buzzer 32, e.g., causing the piezo buzzer 32 to provide a piezo buzzer sound. For example, the rocker switch circuitry 34 may be configured to provide the signaling in the form of the voltage to actuate the piezo buzzer 32. The switch cover 22 and rocker 24 may include, or may be arranged to form, the actuator assembly 26 configured to apply the rocking switch actuator force on the rocker switch circuitry 34, e.g., consistent with that disclosed herein.

Piezo Electric Element 32

As one skilled in the art would appreciate, a piezo electric element like the piezo buzzer 32 may take the form of a crystal or ceramic that deforms slightly when a voltage is applied to it. For example, if one supplies an AC voltage at a few kilohertz, then the crystal or ceramic deforms back and forth at the same speed as the AC signal, and produces an audible sound. The same effect works in reverse, e.g., if one supplies an actuator force that deforms the crystal or ceramic, then the crystal or ceramic provides an electrical signal corresponding to the deformation.

The Rocker Switch Circuitry and Its Associated Functionality

Rocker switches having rocker switch circuitry for implementing associated functionality are known in the art, and the scope of the invention is not intended to be limited to any particular type or kind thereof either now known or later developed in the future. By way of example, FIG. 1 shows a rocker switch cluster including rocker switches having rocker switch circuitry for implementing the following functionality: Turning ON/OFF an LED light bar, or turning ON/OFF spot lights, or turning ON/OFF side lights, or turning ON/OFF roof lights, or turning ON/OFF zombie lights, or turning ON/OFF driving lights. By way of further example, see the U.S. Patents listed herein disclosing rocker switches having rocker switch circuitry for implementing other types and kinds of associated functionality.

By way of example, the rocker switch circuitry 34 may include, or take the form of, the contacts/terminals 34*a*, 33*b* alone, e.g., like that shown in FIGS. 4-5 and 7-8. However, embodiments are envisioned, and the scope of the invention is intended to include, implementing the rocker switch circuitry 34 is the form of a printed circuit board (PCB), e.g., configured to implement different types or kinds of rocker switch circuitry functionality depending on the particular application of the rocker switch assembly. For example, the rocker switching mechanism 20 may include an LED configured in the rocker 24, and the PCB may be configured to turn the LED ON/OFF (or flash the LED at some frequency) depending on the position of the rocker 24. Alternatively, in response to the piezo electric signaling received, the PCB may be configured to process associated signaling and provide corresponding signaling from the rocker switch assembly 10 for further processing by another remote or external device or circuitry. In effect, the scope of the invention is not intended to be limited to the signal processing functionality of the rocker switch circuitry 34, which may include, or take the form of, a simple pair of contacts/terminals like elements 34*a*, 34*b*, as well as more complicated signal processing functionality implemented by more complicated circuitry like a PCB.

Possible Applications

By way of example, possible applications of the present invention may include: High water bilge alarm, Carling switches, etc.

THE SCOPE OF THE INVENTION

While the invention has been described with reference to an exemplary embodiment, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A rocker switch assembly comprising:

a rocker switching mechanism having an actuator assembly with a switch cover and a rocker, the switch cover and the rocker being configured to rock between ON and OFF rocking positions in response to rocking switch forces applied thereon, and provide a rocking switch actuator force when the switch cover and the rocker is rocked into an ON rocking position, but not when the switch cover and the rocker rocks is rocked into an OFF rocking position;

a circuitry housing having a rocker switch circuitry with terminals/contacts arranged therein, the rocker switch circuitry configured to respond to the rocking switch actuator force applied on the rocker switch circuitry by the actuator assembly, and provide rocker switch circuitry voltage signaling on the terminals/contacts; and a piezo buzzer housing having a piezo buzzer arranged therein with wiring coupled to the terminal/contacts of the rocker switch circuitry, the piezo buzzer configured to respond to the rocker switch circuitry voltage signaling, and provide piezo buzzer signaling, based upon the rocker switch circuitry voltage signaling received.

2. A rocker switch assembly according to claim 1, wherein the circuitry housing is configured to receive and house the rocker switch circuitry.

3. A rocker switch assembly according to claim 1, wherein the piezo buzzer housing is configured to receive and house the piezo buzzer.

4. A rocker switch assembly according to claim 1, wherein the rocker switch assembly comprises a rocker base housing having the piezo buzzer housing configured to receive and house the piezo buzzer, and also having the circuitry housing configured to receive and house the rocker switch circuitry.

5. A rocker switch assembly according to claim 1, wherein the piezo buzzer is configured as a crystal or ceramic.

6. A rocker switch assembly according to claim 5, wherein the crystal or ceramic is configured to respond to the rocker switch circuitry voltage signaling, deform and provide the piezo buzzer signaling along with a buzzer sound.

7. A rocker switch assembly according to claim 1, wherein the rocker switch assembly comprises, or forms part of, a rocker switch cluster, including where the rocker switch cluster has multiple rocker switch assemblies.

8. A rocker switch assembly according to claim 1, wherein the wiring is soldered to the terminals/contacts.

9. A rocker switch assembly according to claim 1, wherein the rocker switch circuitry is configured to provide the rocker switch circuitry voltage signaling to actuate the piezo buzzer, including AC voltage signaling.

10. A rocker switch assembly according to claim 1, wherein the rocker switching mechanism comprises an LED configured in the rocker; and the rocker switching mechanism comprises a printed circuit board (PCB) configured to turn ON or flash the LED when the cover and rocker are rocked into the ON rocking position and configured to turn OFF the LED when the cover and rocker are rocked into the OFF rocking position.

* * * * *